US012701273B2

(12) United States Patent
Bell-Geddes et al.

(10) Patent No.: US 12,701,273 B2
(45) Date of Patent: *Aug. 4, 2026

(54) METHODS AND SYSTEMS FOR LIVE STREAMING RECOMMENDED CONTENT

(71) Applicant: Lemon Inc., Grand Cayman (KY)

(72) Inventors: Weston Bell-Geddes, Los Angeles, CA (US); August Yadon, Los Angeles, CA (US); Yu Qin, Los Angeles, CA (US); Guan-Bai Chen, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,575

(22) Filed: Dec. 26, 2024

(65) Prior Publication Data

US 2025/0126306 A1 Apr. 17, 2025

Related U.S. Application Data

(63) Continuation of application No. 18/417,071, filed on Jan. 19, 2024, now Pat. No. 12,219,184, which is a
(Continued)

(51) Int. Cl.
*H04N 21/2187* (2011.01)
*H04N 5/45* (2011.01)
*H04N 21/466* (2011.01)

(52) U.S. Cl.
CPC ........... *H04N 21/2187* (2013.01); *H04N 5/45* (2013.01); *H04N 21/4668* (2013.01)

(58) Field of Classification Search
CPC ... H04N 21/2187; H04N 5/45; H04N 21/4668
See application file for complete search history.

(56) References Cited

U.S. PATENT DOCUMENTS

2018/0234738 A1* 8/2018 Sarkar ................ H04N 21/4858
2019/0273955 A1 9/2019 Yu et al.
(Continued)

FOREIGN PATENT DOCUMENTS

CN 114173143 A 3/2022
JP 2022003776 A 1/2022
(Continued)

OTHER PUBLICATIONS

ISA Intellectual Property Office of Singapore, International Search Report Issued in Application No. PCT/SG2023/050631, Jan. 4, 2024, WIPO, 2 pages.
(Continued)

*Primary Examiner* — Anthony Bantamoi
(74) *Attorney, Agent, or Firm* — Alleman Hall LLP

(57) ABSTRACT

A method for live streaming recommended content from a content request includes live streaming a first content from a first user side, activating a live reaction at the first user side, and providing the content request at a second user side when the live reaction is enabled. The method also includes determining a second content, sending the content request indicating the second content, and receiving a confirmation at the second user side indicating the content request being sent. The method further includes receiving, at the first user side, the content request sent from the second user side, approving the content request at the first user side, and after the content request is approved, live streaming from the first user side, the second content corresponding to the content request.

20 Claims, 8 Drawing Sheets

Related U.S. Application Data continuation of application No. 18/048,158, filed on Oct. 20, 2022, now Pat. No. 11,917,214.

(56) References Cited

U.S. PATENT DOCUMENTS

| | | | |
|---|---|---|---|
| 2023/0024373 A1* | 1/2023 | Dorogusker | ....... H04N 21/2743 |
| 2023/0171438 A1 | 6/2023 | Liu et al. | |

FOREIGN PATENT DOCUMENTS

| | | | |
|---|---|---|---|
| JP | 2022078323 A | 5/2022 |
| KR | 102291316 B1 | 8/2021 |

OTHER PUBLICATIONS

Japan Patent Office, Office Action Issued in Application No. 2025522543, Feb. 17, 2026, 12 pages.

* cited by examiner

200

METHODS AND SYSTEMS FOR LIVE STREAMING RECOMMENDED CONTENT

CROSS REFERENCE OF RELATED APPLICATION

This application is a continuation application of U.S. patent application Ser. No. 18/417,071 filed Jan. 19, 2024, which is a continuation application of U.S. patent application Ser. No. 18/048,158, titled "METHODS AND SYSTEMS FOR LIVE STREAMING RECOMMENDED CONTENT" and filed on Oct. 20, 2022, now U.S. Pat. No. 11,917,214, which are incorporated herein by reference in their entirety for all purposes.

FIELD

The embodiments described herein pertain generally to methods and systems for live streaming. More specifically, the embodiments described herein pertain to methods and systems for live streaming content that is recommended by one or more viewers who are interacting with the streamer.

BACKGROUND

Live streaming is becoming a central part of many users' online experience. Typically, live streaming operates in a one-way live streaming mode. That is, a streamer's device unilaterally pushes a stream to a live streaming platform, and the stream is sent by a forwarding component of the live streaming platform and delivered by a network such as a content delivery network. The live streaming media content is then pulled on a viewer's device, and the streaming media content is played and/or displayed. During the live streaming, one or more viewers may interact with the streamer by using e.g., an asynchronous instant messaging communication such as, by means of text, emoticon, a gift, likes, a game, etc.

SUMMARY

In one example embodiment, a method for live streaming content from a content request includes live streaming a first content from a first user side, activating a live reaction at the first user side, and providing the content request at a second user side when the live reaction is enabled. The method also includes determining a second content, sending the content request indicating the second content, and receiving a confirmation at the second user side indicating the content request being sent. The method further includes receiving, at the first user side, the content request sent from the second user side, approving the content request at the first user side, and after the content request is approved, live streaming from the first user side, the second content corresponding to the content request.

In another example embodiment, a method for live streaming content from a content request includes live streaming a first content from a first user side, activating a live reaction at the first user side, receiving, at the first user side, the content request sent from a second user side, approving the content request at the first user side, and after the content request is approved, live streaming, from the first user side, a second content corresponding to the content request.

In yet another example embodiment, a method for live streaming content from a content request includes receiving, at a second user side, live streaming of a first content from a first user side, providing the content request at the second user side when a live reaction is activated, determining a second content, sending the content request indicating the second content, receiving a confirmation at the second user side indicating the content request being sent, and receiving, at the second user side, live streaming of the second content corresponding to the content request after the content request is approved.

It is to be understood that in many live streams, live audience engagement may be low. Streamers may need more variety in the content they can produce, and viewers may want to be able to share their content with followers of the streamers. Features in the embodiments described herein may allow a respective viewer to have the streamer to live stream the respective viewer's recommended content, so that more viewers may participate in the live streaming to interact with the streamer, and the threshold for creating diverse live content may be lowered. Features in the embodiments described herein may also enable streamers to live stream their real-time reactions (live reactions) to the viewer recommended content (e.g., videos, etc.). Viewers may send their recommended content to the streamer's live streaming, where the recommended content may be played during the live streaming. Features in the embodiments described herein may further help to improve the retention rate of the live streaming and increase the engagement of the streamer. Features in the embodiments described herein may also allow live streamers to lower the barrier to create diverse and captivating live content.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
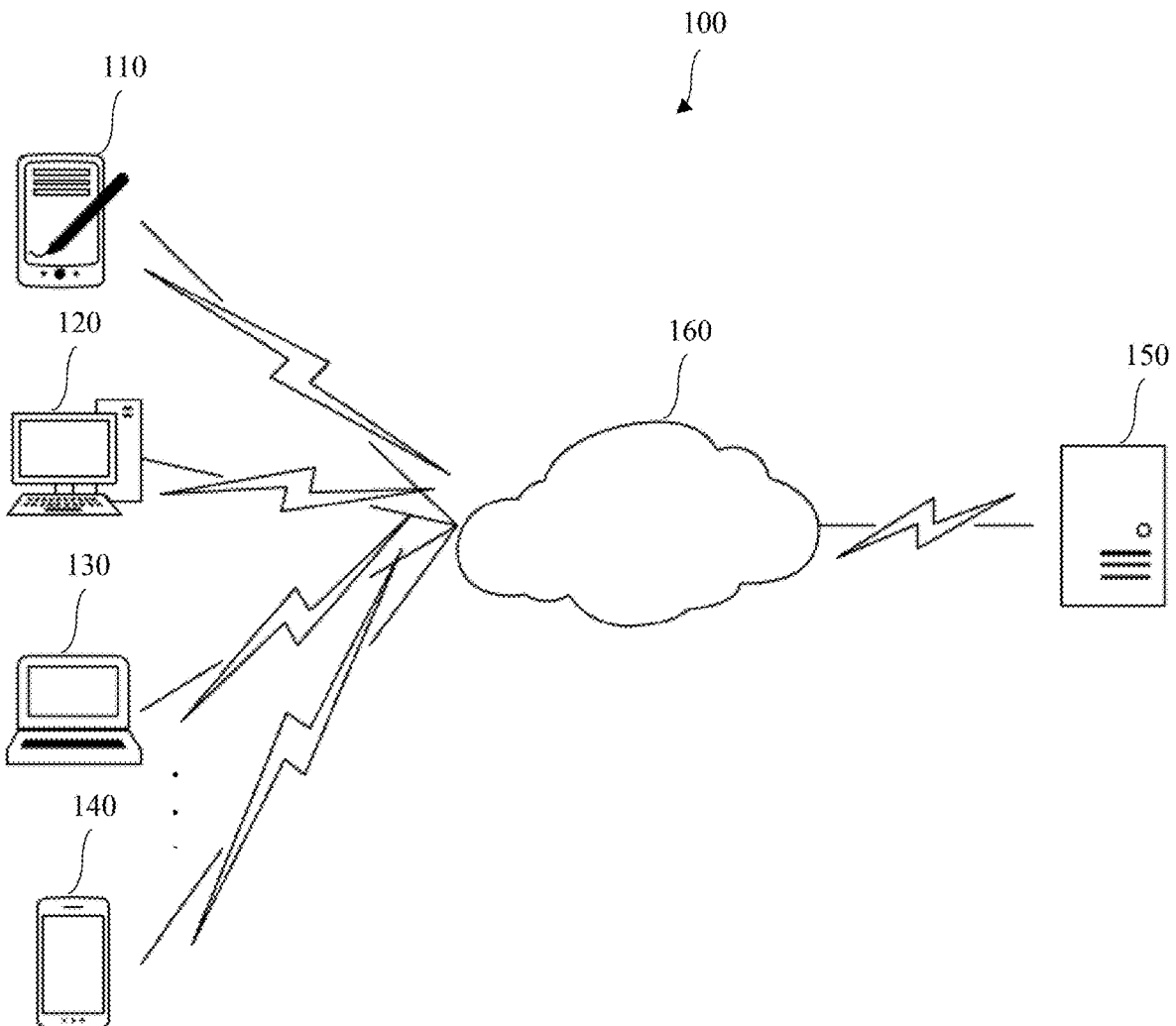
FIG. 1 is a schematic view of an example live streaming system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, the phrase "live stream" or "live streaming" or "livestreaming" may refer to streaming media broadcast in real-time over a network such as the Internet. It is to be understood that non-live media such as video-on-demand, vlogs, YouTube® videos, etc. are technically streamed, but not live-streamed. The phrase "real-time" or "real time" may refer to a guaranteed level of responsiveness within a specified time constraint, usually milliseconds or microseconds, between an event and its response deadline. It is to be understood that real-time typically describes a human sense of time (rather than machine time) that seems immediate, and describes various operations in computing or other processes that must guarantee response times within a specified time (deadline). The phrase "media" or "multimedia" may refer to a form of communication that uses one or more of different content forms such as text, audio, images, animations, video, augmented reality (AR), virtual reality (VR), etc. into a presentation such as an interactive presentation.

As referenced herein, a "streamer," "live streamer," and/or "online streamer" may refer to a person or persons who uses one or more user devices at the streamer side and broadcasts themselves (including but not limited to, e.g., the person's voice, image, audio, video, view, etc.) online through a live stream to an audience in real-time. It is to be understood that a streamer may be an anchor, a presenter, a broadcaster, a commentator, or any other suitable user. A "viewer" may refer to a person on whose device (e.g., one or more user devices at the viewer side), the live stream from the streamer may be received and/or pulled, and the streaming media content may be played. It is to be understood that a streamer may broadcasts himself or herself online through a live streaming to multiple viewers.

As referenced herein, the phrase "artificial intelligence recommended content" or "AI recommended content" may refer to media content recommended by AI algorithm(s) such as a content discovery tool of the live streaming platform, based on a user's viewing or interaction history, etc. In an example embodiment, a user (e.g., a live-streamer, a viewer, etc.) may have his or her own AI recommended content(s), which may be on a list or on a page (e.g., a "For You" page, etc.). The user's AI recommended content page may include a personalized scrollable feed of content and may suggest or recommend new content to the user based on each user's actions on the live streaming platform. The recommended new content may be based on e.g., the type of items the user has viewed, shared, and/or liked in the past. The user's AI recommended content page may include a customized collection of content that the live streaming platform has curated to meet the user's interests and taste, most of which may be based on the user's past behavior on the live streaming platform. Factors that affect what shows up on the user's AI recommended content page may include a (1) actions or interactions that the user takes on the live streaming platform (including likes, shares, comments, follows, content the user created, etc.), (2) video information (information associated with the video, e.g., the live streaming platform recommendations may be based on sounds, hashtags, captions, etc. featured in the videos), and/or (3) device and account settings of the user (including language preferences, country settings, device type, etc. so that the live streaming system may be optimized for performance, and/or local content may be recommended).

The phrase "augmenting" AI recommended content (e.g., with the viewer recommended content) may refer to creating an augmented recommended content for a user (such as the streamer, etc.) that contains both the user's AI recommended content and the user's viewer recommended content (e.g., sent by the viewer to the streamer based on the viewer's AI recommended content, the viewer's bookmarked and/or liked content, etc.).

As referenced herein, the phrase "green-screen segmentation" or "green screen segmentation" or "segmentation" may refer to an algorithm and/or technology that may "cut out" the human from their background. In some example embodiments, this technology may be used to "augment" the user (e.g., a streamer in a live streaming, etc.) in front of a live streaming of the recommended content (e.g., the media content from the user's AI recommended content page, the user's augmented AI recommended content page, etc.), so that both the user and the recommended content may be live streamed using green-screen segmentation.

As referenced herein, the phrase "live react" or "live reaction" may refer to a feature, an algorithm, and/or technology that may enable a live-streamer to allow viewers to send their recommended content, allow viewers to determine recommended content and to send content request indicating the recommended content to the streamer, and allow the streamer to react on the recommended content while live streaming the recommended content during the live streaming of the streamer.

FIG. 1 is a schematic view of an example live streaming system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices having display screens with audio and/or video inputs/outputs and supporting live streaming. The various electronic devices may include but not limited to a smartphone, a tablet computer, an e-book reader, an MP3 (moving picture experts group audio layer III) player, an MP4 (moving picture experts group audio layer IV) player, a laptop computer, a desk computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may enable the streamer and/or the viewer's online activities, and may be implemented by various types of connections, such as a wired communications link, a wireless communications link, an optical fiber cable, etc.

In accordance with at least some example embodiments, the server 150 may be a server for providing various services, such as a server of a live streaming platform for providing live streaming services to the users using one or more of the terminal devices 110, 120, 130, and 140. The server 150 may be implemented by a distributed server cluster including multiple servers or may be implemented by a single server.

A user (e.g., a streamer, a viewer, etc.) may use one or more of the terminal devices 110, 120, 130, and 140 to interact with the server 150 via the network 160, to e.g., transmit or receive live streaming content. Various applications, such as social media applications, video playing applications, or the like, may be installed on the terminal devices 110, 120, 130, and 140 to facilitate the live streaming interaction between devices via the network.

It is to be understood that the method(s) for live streaming content according to the embodiments described herein may be performed by the server 150 and/or the terminal devices 110, 120, 130, and 140, which may be referred to herein as user devices. Accordingly, the apparatus for live streaming may be arranged in the server 150 and/or in the terminal devices 110, 120, 130, and 140.

It is also to be understood that in a case that a live streaming is not performed remotely, the live streaming system may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
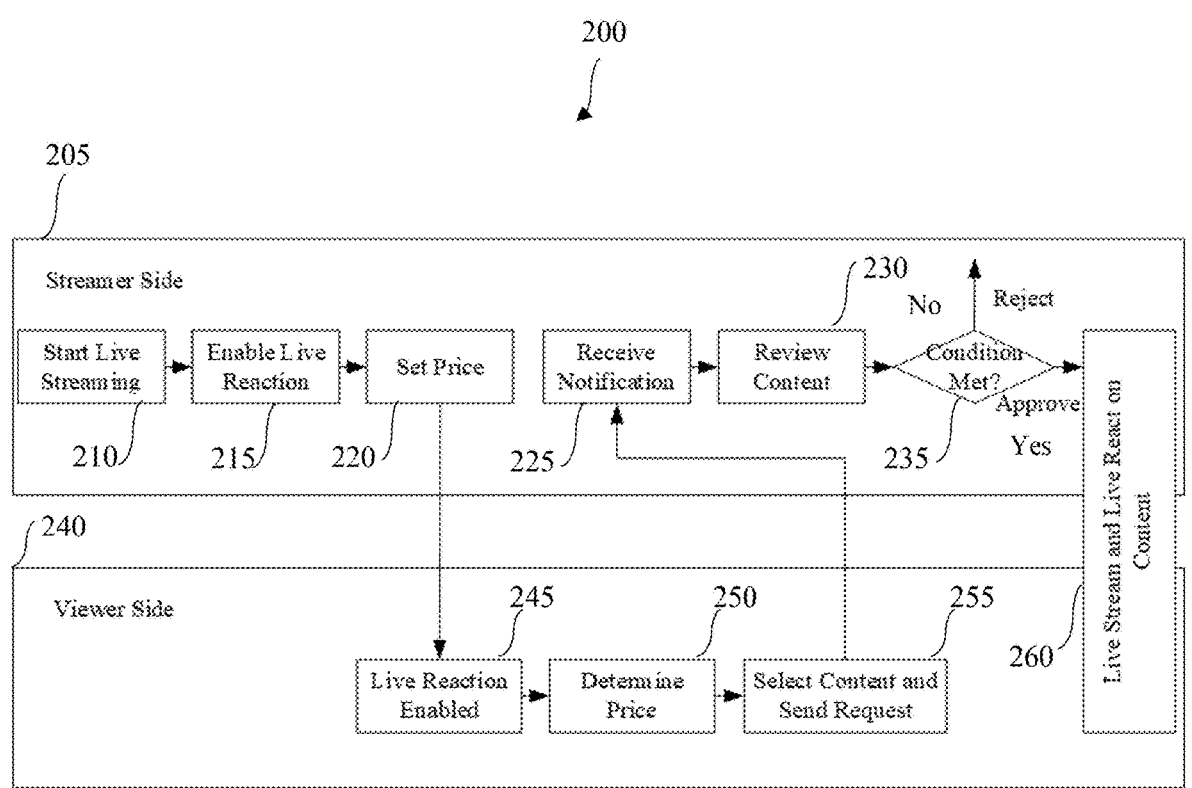
FIG. 2 illustrates an example processing flow for live streaming viewer recommended content corresponding to a content request, in accordance with at least some embodiments described herein.

FIG. 2 illustrates an example processing flow 200 for live streaming viewer recommended content corresponding to a content request, in accordance with at least some embodiments described herein.

Figure 7:
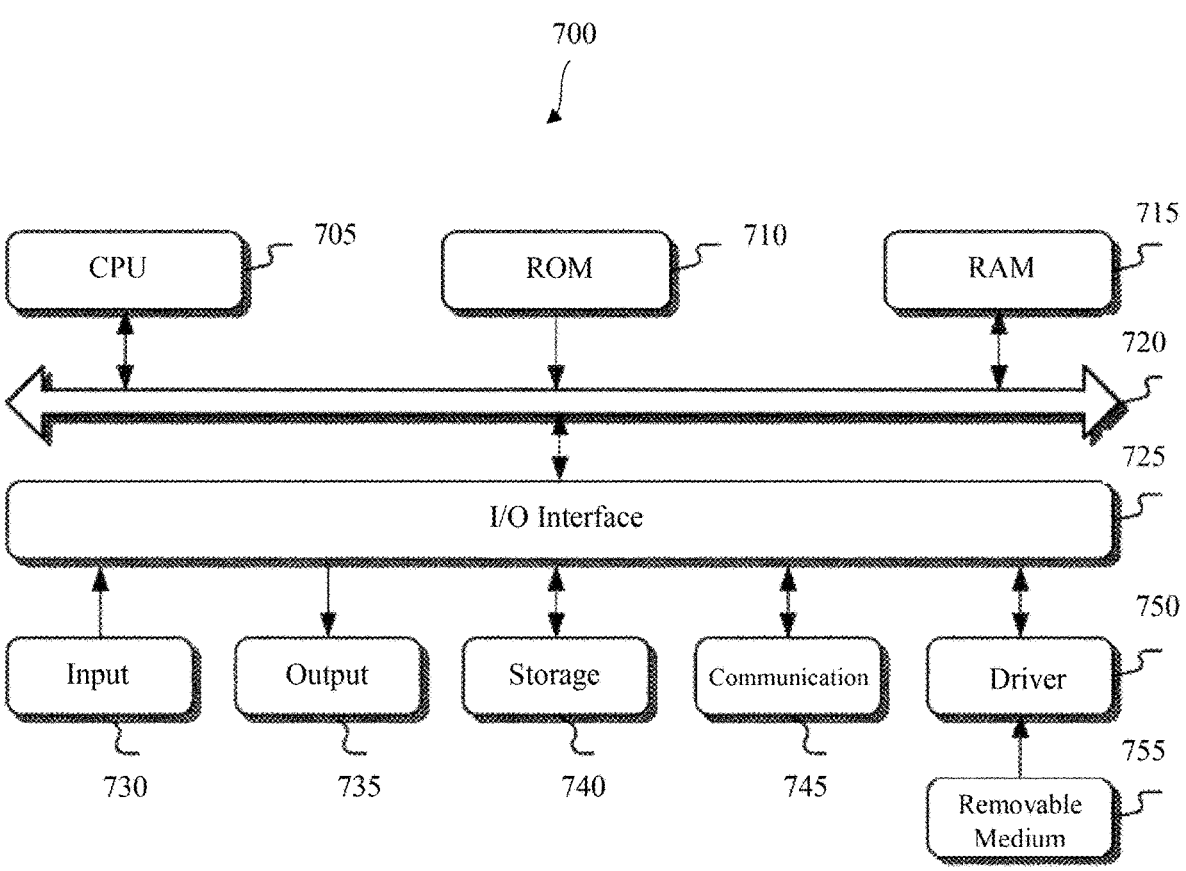
FIG. 7 is a schematic structural diagram of an example computer system applicable to implementing an electronic device, arranged in accordance with at least some embodiments described herein.

It is to be understood that the processing flow 200 disclosed herein may be conducted by one or more processors (e.g., the processor of one or more of the terminal device 110, 120, 130, and 140 of FIG. 1, the processor of the server 150 of FIG. 1, the central processor unit 705 of FIG. 7, and/or any other suitable processor), unless otherwise specified. The conducting processor may communicate with other components of the live streaming system 100 of FIG. 1.

It is also to be understood that the processing flow 200 may include one or more operations, actions, or functions as illustrated by one or more of blocks 210, 215, 220, 225, 230, 235, 245, 250, 255, and 260. Block 205 represents a collection of operations, actions, or functions from the streamer side, e.g., the first user side, conducting and/or performing the live streaming, while block 240 represents a collection of operations, actions, or functions from the viewer side, e.g., the second user side, receiving the live streaming content. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 200 may begin at block 210.

At block 210 (Start Live Streaming), the processor may start a live streaming, e.g., based on the streamer's operation or action. In an example embodiment, the processor may be in the user device at the streamer side and/or in the server of the live streaming platform. It is to be understood that a streamer may initiate the live streaming of the streamer, e.g., via an application installed in a device (e.g., the terminal device 110, 120, 130, and 140 of FIG. 1) that supports live streaming. The audio and/or video inputs of the device may capture the live audio and/or video of the streamer as a live stream, and the live stream may be pushed to a live streaming platform (e.g., installed and/or run on a server such as the server 150 of FIG. 1). The live stream may be sent by e.g., a forwarding system of the live streaming platform and delivered e.g., over network 160 of FIG. 1. The live stream may be pulled on a viewer's device (e.g., the terminal device 110, 120, 130, and 140 of FIG. 1), and the streaming media content (i.e., the live stream) may be played on the viewer's device. Processing may proceed from block 210 to block 215.

At block 215 (Enable Live Reaction), the processor may enable or activate the live reaction or live react feature e.g., based on the streamer's operation or action. In an example embodiment, the processor may be in the user device at the streamer side and/or in the server of the live streaming platform. It is to be understood that the streamer may enable or activate the live reaction feature via an interface (e.g., a graphical user interface (GUI), a command line, etc.) of the streamer's live streaming application. In an example embodiment, activating the live reaction feature is performed after the live streaming of the streamer is started and/or during the live streaming of the streamer. In an example embodiment, the default configuration or setting of the live streaming application may be that the live reaction feature is disabled during the live streaming. It is also to be understood that the streamer may disable or deactivate the live reaction feature (e.g., after the live reaction feature is activated) any time during the live streaming via an interface of the streamer's live streaming application, so that the viewer recommended content may stop being live streamed and/or the viewer may not be able to configure or send the content request. It is further to be understood that the interface(s) for the streamer to enable and/or disable the live reaction feature may not be visible to the viewer. Processing may proceed from block 215 to block 220.

At block 220 (Set Price), the processor may set or determine a price or value for the viewer to send recommended content e.g., based on the streamer's operation or action. In an example embodiment, the processor may be in the user device at the streamer side and/or in the server of the live streaming platform. It is to be understood that the streamer may set a price or value for the viewer to send recommended content via an interface of the live streaming application. The price may specify a currency type used by the live streaming platform. In an example embodiment, the price may range from zero (i.e., free) to a suitable amount or a maximum amount allowable by the live streaming platform (e.g., 30,000 coins or the like). The streamer may select a price from a predetermined price list (e.g., a list-box, a drop-down list, etc.) or enter a customized price via the interface. In an example embodiment, the price may be for one piece of recommended content from a viewer. In another example embodiment, the price may be for a predetermined number of pieces of recommended content from the viewer. It is also to be understood that prices for other services may be set by the streamer or by the live streaming platform (see the description of FIG. 6). It is further to be understood that the interface for streamer to set the price may not be visible to the viewer. Processing may proceed from block 220 to block 245.

At block 245 (Live Reaction Enabled), the processor may enable the viewer to start providing (e.g., configuring, etc.) a content request via an interface. In an example embodiment, the processor may be in the user device at the viewer side and/or in the server of the live streaming platform. It is to be understood that the viewer may start providing (e.g., configuring, etc.) a content request e.g., via an interface of the live streaming application (that enables the viewer to receive and/or watch the live streaming after the streamer starts the live streaming at block 210). It is also to be understood that after the live reaction feature is disabled (by the default setting of the streamer's live streaming application, or by the streamer at any time during the live streaming if the live reaction feature is enabled), the interface for the viewer to start the content request may be disabled or invisible for the viewer. Processing may proceed from block 245 to block 250.

At block 250 (Determine Price), the processor may determine or set the price or value, e.g., based on the viewer's operation or action. In an example embodiment, the processor may be in the user device at the viewer side and/or in the server of the live streaming platform. It is to be understood that after the viewer starts the content request via the interface (e.g., by clicking on an icon or the like on the live streaming application indicating that the live reaction feature is available or enabled), the price that the streamer sets at block 220 may be visible/shown to the viewer via the interface. The viewer may set a price or value via the interface to the price that the streamer sets at block 220. In another example embodiment, the viewer may set a price (i.e., a bidding price) via the interface to an amount higher than the price that the streamer sets at block 220 by, e.g., entering a customized price or selecting from a predetermined price list in hopes that the streamer may select or approve that content request first. It is also to be understood that prices for other services may be set by the viewer (see the description of FIG. 6). It is further to be understood that the processor may e.g., via a user interface or via a control logic, prevent the viewer from setting a price that is lower than the price the streamer sets. Processing may proceed from block 250 to block 255.

At block 255 (Select Content and Send Request), the processor may determine the content and send the content request indicating the recommended content to the streamer e.g., based on the viewer's operation or action. In an example embodiment, the processor may be in the user device at the viewer side and/or in the server of the live streaming platform. It is to be understood that after the viewer determines or sets the price, the viewer may select one or more pieces of recommended content. In an example embodiment, the recommended content may be a video from a list of the viewer's bookmarked and/or liked videos. In another example embodiment, the recommended content may be a video from the viewer's AI recommended content page (e.g., the "For You" page of the viewer, etc.). In yet another example embodiment, the recommended content may include text, audio, images, animations, video, augmented reality, virtual reality, etc. In yet another example embodiment, the recommended content may be contend stored in, accessible by, or permitted by the live streaming platform. The viewer may optionally provide comments to the recommended content via the interface. Then the viewer may send the content request indicating the selected/recommended content, via the interface (e.g., by clicking on a "send" icon, or the like), to the streamer via the live streaming application. After the content request is sent, the viewer may receive a confirmation that the content request has been sent, via a notification (e.g., display, sound, etc.) from the viewer's live streaming application. Processing may proceed from block 255 to block 225.

It is to be understood that during the processes at blocks 245, 250, and/or 255 (i.e., between block 220 and block 225), the streamer may continue the live streaming of himself or herself (i.e., the live streaming of block 210)

and/or the live streaming of other content (see the description of block 260). The viewer's operation or action via the interface at blocks 245, 250, and/or 255 may not be visible to the streamer.

At block 225 (Receive Notification), the processor may send a notification regarding the content request at block 255 to the streamer. In an example embodiment, the processor may be in the user device at the streamer side and/or in the server of the live streaming platform. It is to be understood that the notification to the streamer may be a display, a sound, an indication, etc. from the streamer's live streaming application. The streamer may view the content requests via an interface (e.g., a GUI, etc.) of the streamer's live streaming application. Processing may proceed from block 225 to block 230.

It is to be understood that multiple viewers may send multiple content requests at or around the same time or at different times. The content requests may be pipelined in a queue for the streamer to act on. In an example embodiment, the content requests may be sorted or prioritized by e.g., order of receipt, price or value (set or determined by the viewer or the streamer), recommendation (which may take into consideration the quality of the video based on a determination of the AI algorithms of the live streaming platform, the following (e.g., how many followers, the quality of following, etc.) of the viewer who recommended the content, etc.), whether the request was sent by friends, whether the request was sent by other influencers or other streamers, whether the request was sent by the highest bidder, etc.

At block 230 (Review Content), the processor may display the content request(s) from the viewer(s) e.g., via a display on the streamer's device, to the streamer so that the streamer (or a user acting on the streamer's behalf) may review the content request. In an example embodiment, the processor may be in the user device at the streamer side and/or in the server of the live streaming platform. It is to be understood that the streamer may review the content request and/or preview the recommended content (e.g., a video, etc.) corresponding to the content request (e.g., the content request may include a link to the recommended content, the recommended content may be embedded in the content request, etc.), e.g., via an interface of the streamer's live streaming application. Processing may proceed from block 230 to block 235.

At block 235 (Condition Met?), the processor may grant approval to the content request or reject (or deny, block, etc.) the content request e.g., based on a condition, criteria, and/or the streamer's operation or action. In an example embodiment, the processor may be in the user device at the streamer side and/or in the server of the live streaming platform. It is to be understood that the streamer (or a user acting on the streamer's behalf) may approve the content request when a condition is met. The streamer (or a user acting on the streamer's behalf) may reject the content request when a condition is not met. The condition may be any suitable condition that the streamer (or a user acting on the streamer's behalf) or the live streaming platform sets. In an example embodiment, the condition may include e.g., the streamer's personal preference (or of the user who acts on the streamer's behalf), a maximized monetary gain, the time left for the live streaming versus the length of the video, etc. It is to be understood that the condition may alternatively be regarded as preference. The streamer (or a user acting on the streamer's behalf) may approve or reject the content request, e.g., via an interface of the streamer's live streaming application. When the content request is rejected, processing may proceed from block 235 to any one of blocks 210, 215, 220, 225, and 230. When the content request is approved, processing may proceed from block 235 to block 260.

It is to be understood that during the processes at blocks 225, 230, and/or 235, the streamer may continue the live streaming of himself or herself (i.e., the live streaming started at block 210) and/or the live streaming of other content (see the description of block 260). The interfaces for streamer's operation or action at blocks 225, 230, and/or 235 may not be visible to the viewer. It is also to be understood that after the content request is approved, the processor may distribute the amount of the price set or determined by the viewer from the viewer's account to the streamer's account or any other suitable account(s) in the live streaming platform.

At block 260 (Live Stream and Live React on Content), the processor may perform live streaming of the content (corresponding to the approved content request) recommended by the viewer during the live streaming of the streamer (e.g., the live streaming started at block 210). In an example embodiment, live streaming the viewer recommended content is performed during the live streaming of the streamer and/or after the content request is approved. In an example embodiment, the processor may be in the user device at the streamer side and/or at the viewer side and/or in the server of the live streaming platform. It is to be understood that after the content request is approved, the processor may receive the recommended content (e.g., the video, etc.) from e.g., a server or a storage of the live streaming platform where the content is stored. It is also to be understood that the streamer may react to the recommended content (in the live streaming of the streamer) during the live streaming of the recommended content. It is further to be understood that there can be two live streams: the first live stream is the live streaming of the streamer started at block 210 (and/or the streamer's reaction on the live streamed recommended content), the second live stream is the live streaming of the recommended content. The recommended content can be the streamer's AI recommended content (e.g., content from the streamer's "For You" page, the streamer's bookmarked and/or liked content/videos, etc., which may be live streamed during the live streaming of the streamer), or the streamer's AI recommended content augmented by or with the approved viewer recommended content. It is to be understood that the viewer may receive and watch the live streaming of first live stream and/or the second live stream. Processing may proceed from block 260 to any one of blocks 210, 215, 220, 225, and 230.

It is to be understood that streamer may select or switch layout types (reaction layout types) for the live streaming of the first live stream and the second live stream. The layout types include a side by side layout (e.g., the first live stream is live streamed in the left side of the display or screen of a terminal device and the second live stream is live streamed in the right side of the display or screen of the terminal device, or vice versa), a top and bottom layout (e.g., the first live stream is live streamed in the top of the display or screen of a terminal device and the second live stream is live streamed in the bottom of the display or screen of the terminal device, or vice versa), a picture in picture layout (e.g., the first live stream is live streamed in a floating window (on top of the window where the second live stream is live streamed) in the display or screen of a terminal device, or the second live stream is live streamed in a floating window (on top of the window where the first live stream is live streamed) in the display or screen of a terminal device), a segmentation (e.g., a green-screen segmentation, etc.) layout (e.g., the subject of the first live stream is "cut out" from the subject's background and the second live stream is live streamed in an area replacing or covering the subject's background, or the subject in the second live stream is "cut out" from the subject's background and the first live stream is live streamed in an area replacing or covering the subject's background), or the like. In an example embodiment, the subject is a person (e.g., the streamer, another person or object shown in the live streaming, etc.). The streamer may select or switch between layout types, via e.g., an interface of the streamer's live streaming application, for displaying or showing the live streaming of first live stream and the second live stream.

It is also to be understood that at block 210, there can be either a live streaming of the streamer or live streaming of two live streams: the first live stream is the live streaming of the streamer (which may continue throughout the processing from 210 to 260), and the second live stream is the live streaming of the streamer's AI recommended content (the recommended content may be live streamed one by one until all recommended contents are live streamed or until the streamer stops the live streaming of the recommended contents). The streamer may select or switch between layout types, via e.g., an interface of the streamer's live streaming application, for displaying or showing the first live stream and the second live stream.

Figure 3:
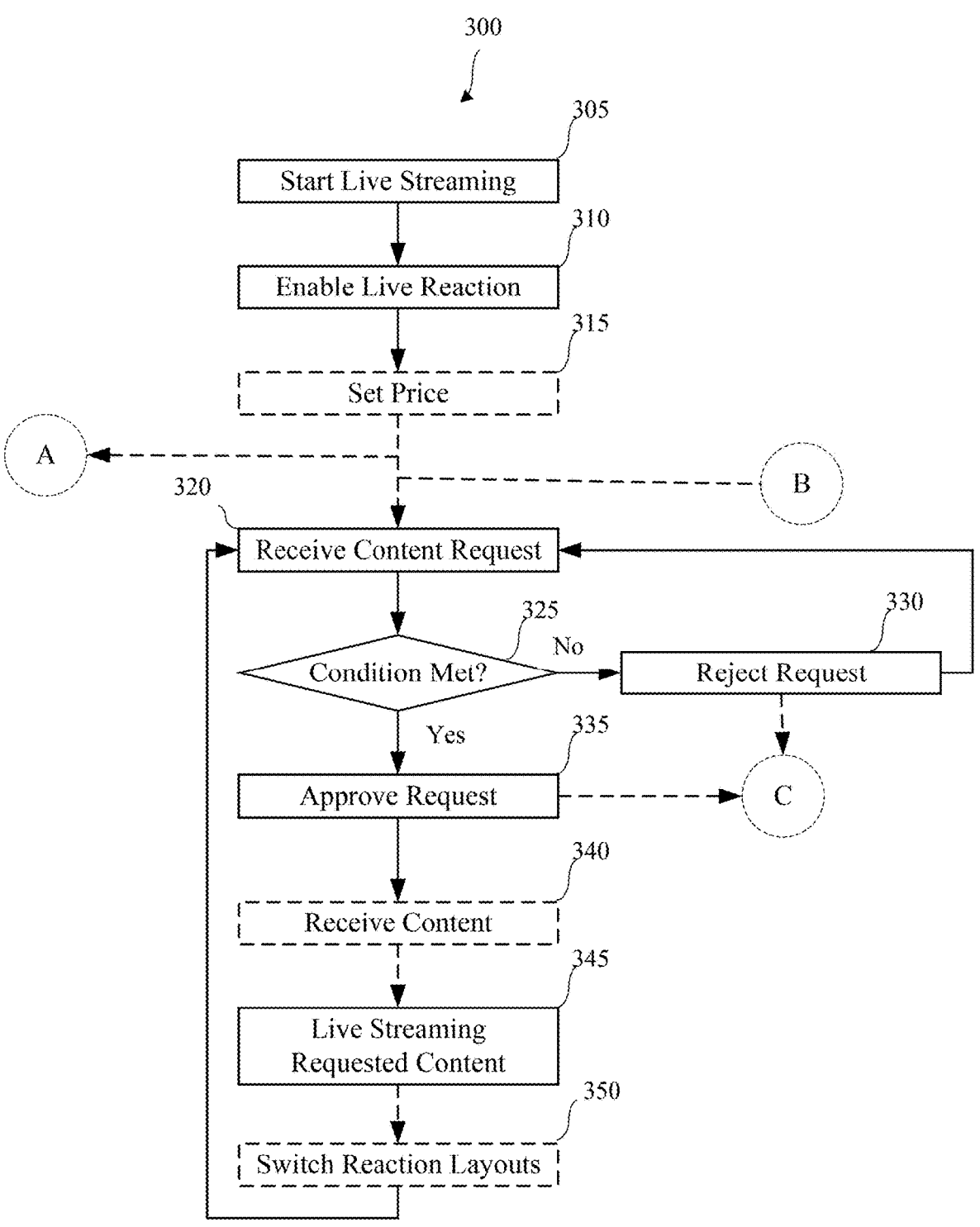
FIG. 3 is a flow chart illustrating an example processing flow at the streamer side for live streaming viewer recommended content, in accordance with at least some embodiments described herein.

FIG. 3 is a flow chart illustrating an example processing flow 300 at the streamer side for live streaming viewer recommended content, in accordance with at least some embodiments described herein. It is to be understood that the processing flow 300 may be the same as or similar to the block 205 of FIG. 2, unless otherwise specified.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 705 of FIG. 7, and/or any other suitable processor), unless otherwise specified.

It is also to be understood that the processing flow 300 can include one or more operations, actions, or functions as illustrated by one or more of blocks 305, 310, 315, 320, 325, 330, 335, 340, 345, and 350. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 300 may begin at block 305.

Block 305 (Start Live Streaming) may be the same as or similar to block 210 of FIG. 2, where there can be either a live streaming of the streamer or live streaming of two live streams: the first live stream is the live streaming of the streamer and the second live stream is the live streaming of the streamer's AI recommended content. Processing may proceed from block 305 to block 310. Block 310 (Enable Live Reaction) may be the same as or similar to block 215 of FIG. 2. Processing may proceed from block 310 to block 315. Block 315 (Set Price) may be optional and may be the same as or similar to block 220 of FIG. 2. Processing may proceed from block 315 to block 320. It is to be understood that processing may proceed from block 315 to block A of the processing flow 400 of FIG. 4, and that processing may proceed from block B of the processing flow 400 of FIG. 4 to block 320.

Block 320 (Receive Content Request) may be the same as or similar to block 225 of FIG. 2. In another example embodiment, block 320 may be the same as or similar to blocks 225 and 230 of FIG. 2 combined. Processing may proceed from block 320 to block 325. The combination of blocks 325 (Condition Met?), 330 (Reject Request), and 335 (Approve Request) may be the same as or similar to block 235 of FIG. 2. When the content request is rejected, processing may proceed from block 330 to block 320 (or to any one of blocks 305, 310, and 315). When the content request is approved, processing may proceed from block 335 to block 340. It is to be understood that processing may proceed from block 330 and/or block 335 to block C of the processing flow 400 of FIG. 4.

Block 340 (Receive Content) may be optional. The combination of blocks 340 and 345 (Live Streaming Requested Content) may be the same as or similar to block 260 of FIG. 2. Processing may proceed from block 345 to block 350.

Block 350 (Switch Request Layouts) may be optional. At block 350, the processor may enable the streamer to switch reaction layouts e.g., based on the streamer's operation or action. It is to be understood that streamer may select or switch layout types (reaction layout types) for the live streaming of the first live stream and the second live stream. The layout types include a side by side layout, a top and bottom layout, a picture in picture layout, a segmentation (e.g., a green-screen segmentation, etc.) layout, or the like. The streamer may select or switch between layout types, via e.g., an interface of the streamer's live streaming application, for displaying or showing the live streaming of first live stream and the second live stream. Processing may proceed from block 350 to block 320. In another example embodiment, processing may proceed from block 250 to any one of blocks 305, 310, and 315.

Figure 4:
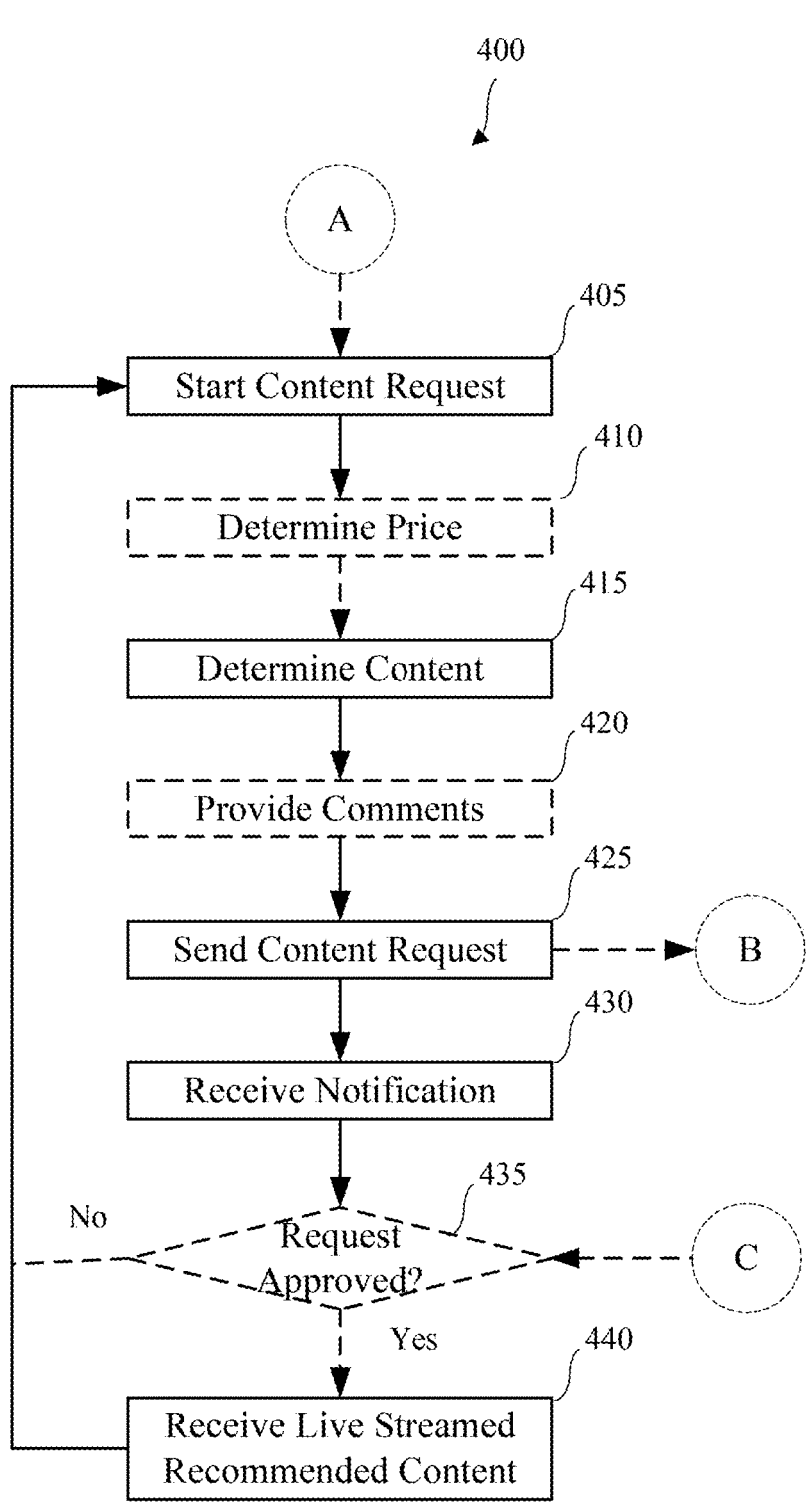
FIG. 4 is a flow chart illustrating an example processing flow at the viewer side for live streaming viewer recommended content, in accordance with at least some embodiments described herein.

FIG. 4 is a flow chart illustrating an example processing flow 400 at the viewer side for live streaming viewer recommended content, in accordance with at least some embodiments described herein. It is to be understood that the processing flow 400 may be the same as or similar to the block 240 of FIG. 2, unless otherwise specified.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, the central processor unit 705 of FIG. 7, and/or any other suitable processor), unless otherwise specified.

It is also to be understood that the processing flow 400 can include one or more operations, actions, or functions as illustrated by one or more of blocks 405, 410, 415, 420, 425, 430, 435, and 440. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 400 may begin at block 405.

Block 405 (Start Content Request) may be the same as or similar to block 245 of FIG. 2. Processing may proceed from block 405 to block 410. Block 410 (Determine Price) may be optional and may be the same as or similar to block 250 of FIG. 2. Processing may proceed from block 410 to block 415. The combination of blocks 415 (Determine Content), 420 (Provide Comments), 425 (Send Content Request), and 430 (Receive Notification) may be the same as or similar to block 255 of FIG. 2. It is to be understood that processing may proceed from block 425 to block B of the processing flow 300 of FIG. 3. Processing may proceed from block 430 to block 435.

Block 435 (Request Approved) may be optional. It is to be understood that processing may proceed from block C of the processing flow 300 of FIG. 3 to block 435. Via block 435, when the content request is rejected (by e.g., the streamer, etc.), processing may proceed from block 430 to block 405; and when the content request is approved (by e.g., the streamer, etc.), processing may proceed from block 430 to block 440.

At block 440 (Receive Live Streamed Recommended Content), the processor may send the viewer (e.g., via viewer's terminal device, etc.) the first live stream (the live streaming of the streamer and/or the streamer's reaction on the live streamed recommended content) and the second live stream (the live streaming of the recommended content, which may include the streamer's AI recommended content and/or the streamer's AI recommended content augmented by or with the approved viewer recommended content). It is to be understood that the viewer may receive and watch the live streaming of the first live stream and/or the second live stream. Processing may proceed from block 440 to block 405.

Figure 5A:
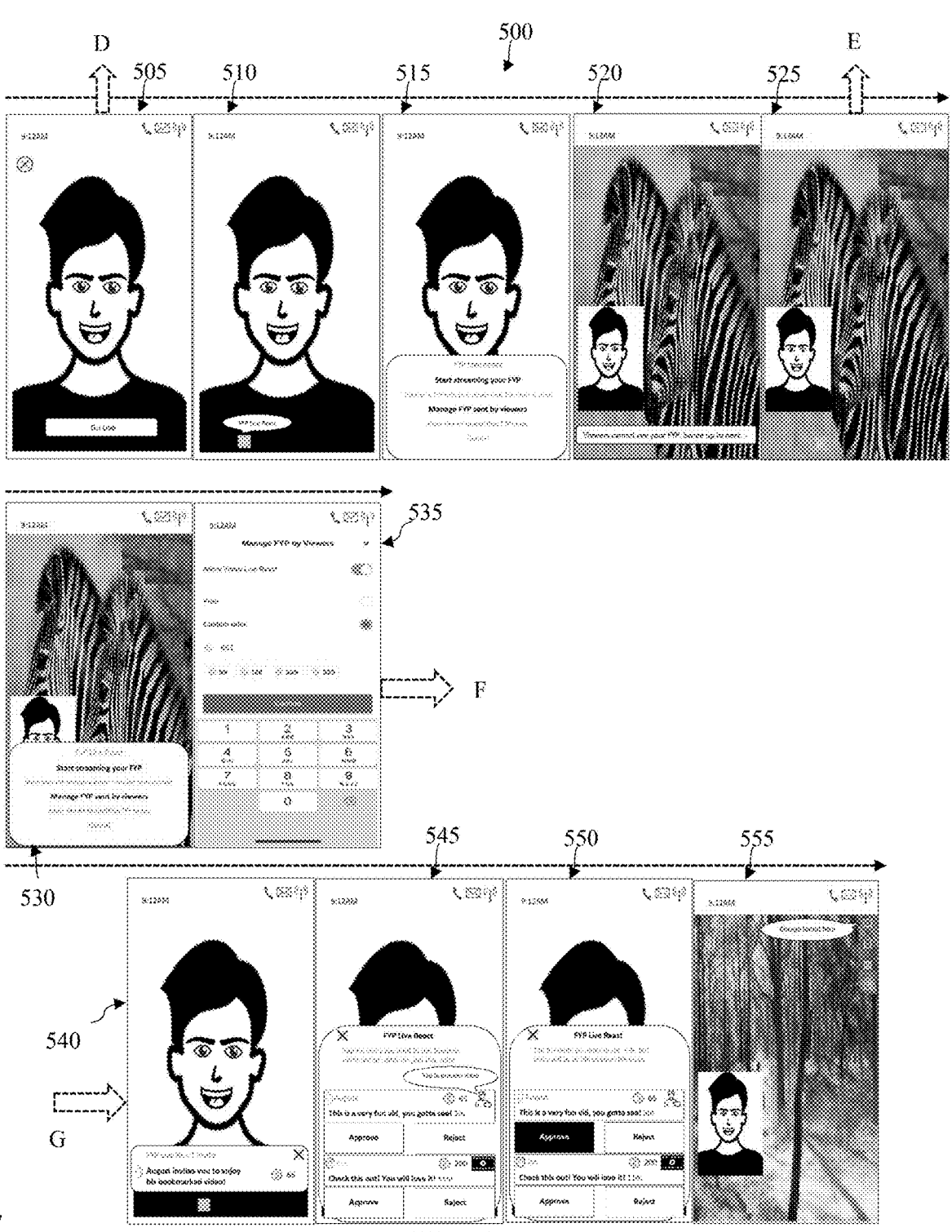
FIGS. 5A and 5B show example interfaces of a live streaming application at the streamer side and example interfaces of a live streaming application at the viewer side, in accordance with at least some embodiments described herein.
Figure 5B:
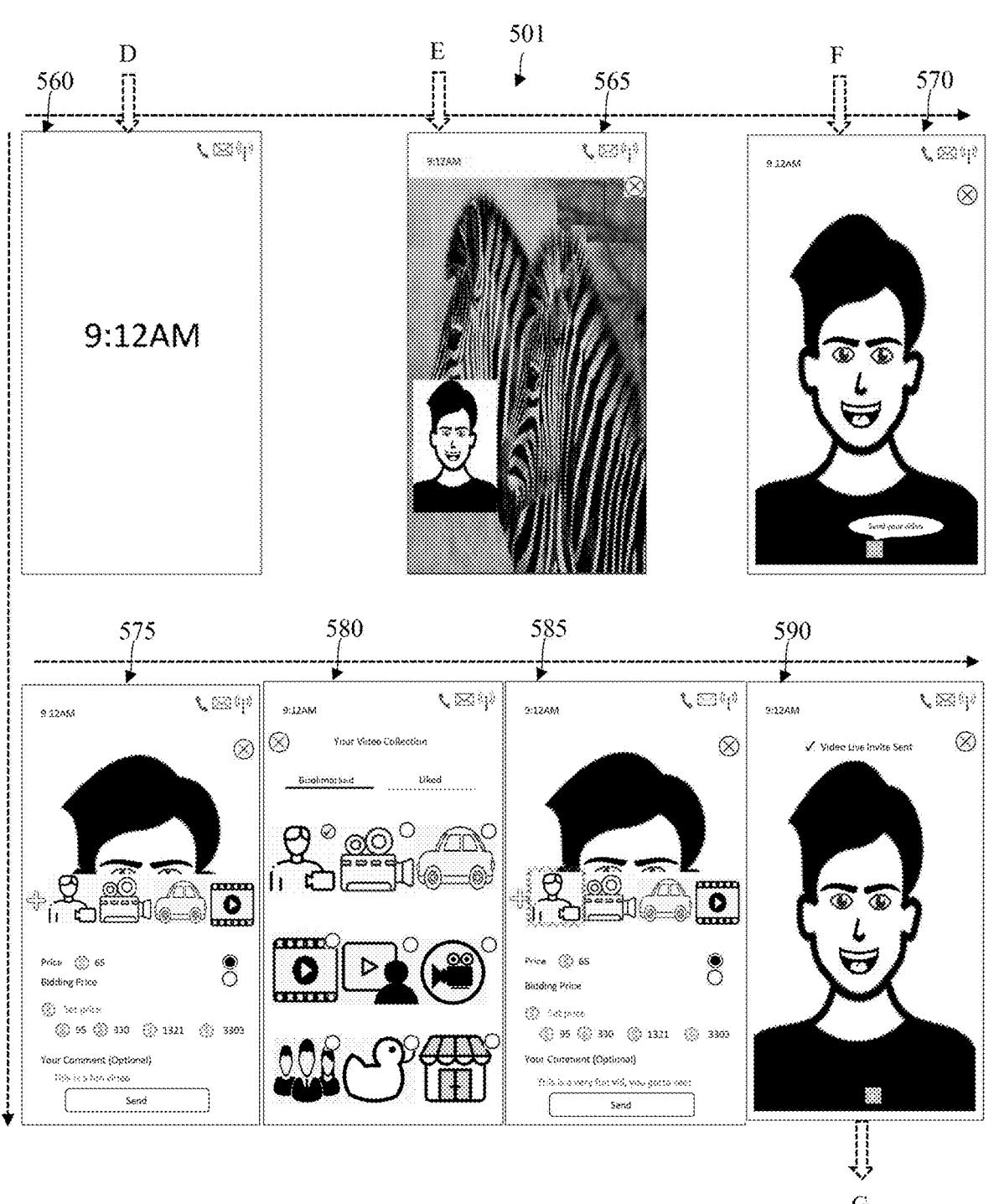

FIGS. 5A and 5B show, respectively, example interfaces 500 of a live streaming application at the streamer side and example interfaces 501 of a live streaming application at the viewer side, in accordance with at least some embodiments described herein.

It is to be understood that the interfaces 500 and 501 (including interfaces 505-555 and 560-590) and/or other interface(s) disclosed herein can be caused to be displayed by one or more processors (e.g., the processor of one or more of the terminal device 110, 120, 130, and 140 of FIG. 1, the processor of the server 150 of FIG. 1, the central processor unit 705 of FIG. 7, and/or any other suitable processor) via one or more output devices (e.g., the output device 735 of FIG. 7, etc.), unless otherwise specified.

As referenced herein, the phrase "interface" may refer to a form of user interface that allows a user to interact with e.g., an electronic device through e.g., icon, indicator, etc. It is to be understood that the interface may refer to a visual way of interacting with the device using items such as window, icon, menu, button, dialogue box, text field, etc., used by an application. It is also to be understood that each of the interfaces 505-555 and 560-590 may include or show a screen shot of a live streaming content as the background in the corresponding layout/content area.

It is also to be understood that modifications may be made to the interfaces 505-590, e.g., two or more of the interfaces may be re-ordered; further interfaces may be added; and various interfaces may be divided into additional interfaces, combined into fewer interfaces, or eliminated, depending on the desired implementation.

It is further to be understood that the interfaces 500 and 501 may include graphical user interfaces (GUIs), command lines, or any other suitable interfaces. GUIs 505-555 of a live streaming application may be displayed on a terminal device at the streamer side. GUIs 560-590 of a live streaming application may be displayed on a terminal device at the viewer side. GUIs 505-555 and 560-590 may represent the user interfaces of the processing flow 200 of FIG. 2. It is also to be understood that in FIGS. 5A and 5B, the dotted line arrows may refer to the order or sequence of time, and the doted block arrows may refer to the order or sequence of time and/or the order or sequence of control flow or logic (e.g., between the GUIs 500 of the streamer side and the GUIs 501 of the viewer side).

In an example embodiment, the streamer may start a live streaming of the streamer (the first live stream) via GUI 505 (e.g., by clicking on an icon or the like). In an example embodiment, a "Go LIVE" icon or the like may be clicked on via GUI 505 for the streamer to start the live streaming (and GUI 510 may then be shown). The streamer may also start to manage a live streaming of the streamer's recommended content (the second live stream) via GUI 510 (e.g., by clicking on an icon or the like during the live streaming of the first live stream). In an example embodiment, a "FYP Live React" icon or the like may be clicked on via GUI 510 for the streamer to manage the live react or live reaction feature (and GUI 515 may then be shown).

In an example embodiment, the streamer may further start to manage (e.g., to begin) a live streaming of the streamer's AI recommended content (which may be live streamed during the live streaming of the streamer after the "streaming AI recommended content feature" is started), or a live streaming of the streamer's AI recommended content augmented by or with the approved viewer recommended content, and/or to cancel or close the management of the second live stream via GUI 515 (e.g., by clicking on an icon or the like during the live streaming of the first live stream). In an example embodiment, a "Start streaming your FYP" icon or the like may be clicked on via GUI 515 for the streamer to start streaming the streamer's AI recommended content during the live streaming of the streamer (and GUI 520 may then be shown).

In an example embodiment, the streamer may enable a live streaming of the streamer's AI recommended content via GUI 520 (showing both the live streaming of the first live stream and the live streaming of the second live stream to the streamer only; the live streaming of the second live stream is not visible to the viewers yet).

After an action (e.g., swiping the screen or the like) is taken via GUI 520 (and GUI 525 may then be shown), the streamer may start the live streaming of the streamer's AI recommended content via GUI 525 (showing both the live streaming of the first live stream and the live streaming of the second live stream to the streamer; the live streaming of the second live stream is now also visible to the viewers).

GUI 565 (showing both the live streaming of the first live stream and the live streaming of the second live stream to the viewer) is at the viewer side and can be the same as or similar to GUI 525. That is, the viewer may receive and watch the live streaming of the first live stream and the live streaming of the second live stream via GUI 565 when the streamer starts the live streaming of the streamer's AI recommended content via GUI 525. Before the streamer starts the live streaming of the streamer's AI recommended content via GUI 525. The viewer may not receive any live streaming (e.g., via GUI 560, at the viewer side, before the viewer starting any live streaming) or may receive and watch the live streaming of the first live stream only (e.g., after the viewer starting the live streaming of the first live stream).

It is to be understood that although GUIs 525 and 565 show a picture in picture layout, the streamer may select or switch between different layouts.

In an example embodiment, a "FYP Live React" icon or the like may be clicked on via GUI 525 for the streamer to manage the live react or live reaction feature (and GUI 530 may then be shown), and the streamer may further start to manage (e.g., to stop) a live streaming of the streamer's AI recommended content, to manage a live streaming of the streamer's AI recommended content augmented by or with the approved viewer recommended content, and/or to cancel or close the management of the second live stream via GUI 530 (e.g., by clicking on an icon or the like during the live streaming of the first live stream).

In an example embodiment, a "Manage FYP by viewers" icon or the like may be clicked on via GUI 530 for the streamer to manage the streamer's augmented AI recommended content (and GUI 535 may then be shown). In an example embodiment, the streamer may then configure a live streaming of the streamer's AI recommended content augmented by or with the approved viewer recommended content via GUI 535. Via GUI 535, the streamer may enable (allowing content request from the viewer) or disable (not allowing content request from the viewer) the "live react" or "live reaction" feature, the streamer may set the price (to zero ("free"), by entering a customized price, by selecting a predetermined price from a list, etc.) for the content request, or the streamer may cancel or close the configuration/management of the live react feature, etc. In an example embodiment, the content request from the viewer is allowed or enabled, a price is set, and a "Confirm" icon or the like is clicked on for the streamer to confirm such settings via GUI 535. The streamer may continue the live streaming (e.g., of the first live stream and/or the second live stream).

After the streamer enables or allows the content request from the viewer via GUI 535, the viewer may start a content request via GUI 570 (at the viewer side, showing the live streaming of the first live stream and/or the live streaming of the second live stream to the viewer) e.g., by clicking on an icon or the like. In an example embodiment, a "Send Your Video" icon or the like may be clicked on for the viewer to manage or configure the content request via GUI 570 (and GUI 575 may then be shown).

In an example embodiment, via GUI 575, the price set by the streamer may be visible to the viewer, and the viewer may set a price to the price the streamer sets (i.e., a minimum price), or select a price (that is higher than the minimum price) from a predetermined list of prices or enter a customized price (i.e., a bidding price that is higher than the minimum price) in hopes that the streamer may select or approve the viewer's request first, or cancel or close the configuration or management of the content request e.g., by clicking on an icon or the like. In an example embodiment, via GUI 575, the viewer's AI recommended content list (and/or the viewer's bookmarked and/or liked content/video list, etc.) may be shown, and the viewer may select content (e.g., videos, etc.) from the viewer's content list e.g., by clicking on an icon or the like. In an example embodiment, a "+" icon or the like may be clicked on for the viewer to select a content via GUI 575 (and GUI 580 may then be shown).

In an example embodiment, via GUI 580, the viewer may select content(s) from the viewer's AI recommended content list and/or the viewer's bookmarked and/or liked content list, etc. In an example embodiment, an "X" icon or the like may be clicked on for the viewer to confirm the selection (zero selection, one selection, or multiple selections) of content(s) via GUI 580 (and GUI 585 may then be shown).

In an example embodiment, via GUI 585, the viewer may provide comment(s) to the selected content (i.e., the viewer recommended content from the viewer's content list), or cancel or close the configuration or management of the content request e.g., by clicking on an icon or the like. A "Send" icon or the like may be clicked on for the viewer to send the content request indicating the viewer's setting price, the viewer's recommended content, the viewer's comments, etc. to the streamer via GUI 585 (and GUI 590 may then be shown). It will be appreciated that the live streaming of the first live stream and/or the second live stream may still be shown at the viewer's side via GUIs 575, 580, and 585.

In an example embodiment, via GUI 590 (showing the live streaming of the first live stream and/or the second live stream), the viewer may receive a confirmation or notification that the content request has been sent.

In an example embodiment, after the viewer sends the content request, the streamer may receive a notification corresponding to the viewer's content request via GUI 540 (at the streamer side, showing the live streaming of the first live stream and/or the second live stream). In an example embodiment, a "FYP Live React" icon or the like may be clicked on via GUI 540 for the streamer to manage the live react or live reaction feature (and GUI 545 may then be shown).

In an example embodiment, via GUI 545, each content request from the viewer(s) may be displayed. Each content request may include the viewer's identification, the viewer's comments on the recommended content, the price the viewer sets, a preview icon of the requested content for the streamer (or for any suitable user acting on the streamer's behalf) to preview the content, an icon for the streamer to approve the request, an icon for the streamer to reject the request, etc. Via GUI 545, the content requests may be sorted by e.g., recency, viewer's or streamer's setting price, recommendation, etc. in e.g., a descending or ascending order. The streamer may approve any content request if the condition(s) set e.g., by the streamer, by the live streaming platform, etc. is/are satisfied. The streamer may reject any content request if the condition(s) is/are not satisfied. The streamer may also cancel or close the configuration or management of the content request e.g., by clicking on an icon or the like via GUI 545.

In an example embodiment, via GUI 545, the streamer may approve a content request by e.g., clicking on an "Approve" icon or the like (and GUI 550 may then be shown). The content corresponding to the approved content request may be queued to be live streamed one after the other by an order (e.g., the order of the approval time, the order of viewer's or streamer's setting price, etc.), along with (or without) e.g., the queued streamer's AI recommended content, as the second live stream to be live streamed. Via GUI 545, the streamer may also reject (or deny, block, etc.) a content request by e.g., clicking on a "Deny" icon or the like (and GUI 550 may then be shown). The rejected content request may be removed from or may remain staying in the content request list that is visible to the streamer. The streamer may also cancel or close the configuration or management of the content request e.g., by clicking on an icon or the like via GUI 550 (and GUI 555 may then be shown).

In an example embodiment, via GUI 555, the first live stream and the second live stream may be live streamed. The streamer may change the layout of the first live stream and the second live stream by e.g., clicking on a "Change layout" icon or the like. In the live streaming of the first live stream, the streamer may react on the second live stream (e.g., the viewer recommended content) that is also being live streamed.

Figure 6:
FIG. 6 shows another example interface of configuring or managing the content request at the viewer side, in accordance with at least some embodiments described herein.

FIG. 6 shows another example interface 600 of configuring or managing the content request at the viewer side, in accordance with at least some embodiments described herein. In an example embodiment, the interface 600 may include a GUI, command lines, or any other suitable interfaces.

In an example embodiment, the GUI 600 may include some or all the features of GUI 575 and/or 585 of FIG. 5B. In an example embodiment, the GUI 600 may also include features for the viewer, e.g., via a processor in the user device at the viewer side and/or in the server of the live streaming platform, to set or determine price(s) for showing a link to the viewer recommended content when such content is live streamed (after the streamer approves the corresponding content request and the link is enabled e.g., by a processor in the user device at the streamer side and/or in the server of the live streaming platform) so that any viewer(s) receiving and/or watching the live streaming of the such content may click on the link to play the content directly (instead of watching it in the live streaming) e.g., via a processor in the user device at the viewer side and/or in the server of the live streaming platform. In an example embodiment, the GUI 600 may further include features for the viewer, e.g., via a processor in the user device at the viewer side and/or in the server of the live streaming platform, to set or determine price(s) for accumulating a number of actions such as "likes" (representing a degree of popularity), etc. so that the "likes" given by the viewer(s) to the content during the live streaming of the content (as the second live stream) can be accumulated for such content e.g., by a processor in the user device at the streamer side or at the viewer side and/or in the server of the live streaming platform. In an example embodiment, the GUI 600 may also include features for the viewer, e.g., via a processor in the user device at the viewer side and/or in the server of the live streaming platform, to set or determine price(s) for recording the streamer's reaction on the live streamed viewer requested content as a new content (e.g., a video, etc.) so that the live streaming of the first live stream (the streamer and/or his or her reaction on the second live stream) and the live streaming of the second live stream (viewer recommended content) can be recorded as the new content e.g., by a processor in the user device at the streamer side and/or in the server of the live streaming platform. It is to be understood that the GUI 600 may further include other features for the viewer to pay such that the higher price the viewer pays, the higher exposure the viewer recommended content may obtain.

It is to be understood that corresponding to GUI 600 (instead of GUI 575 and/or GUI 585), GUIs 500 (e.g., GUIs 535, 545, 550, 555, etc.) may be modified or enhanced to include the corresponding features at the streamer side. In an example embodiment, via an interface similar to the modified GUI 555, during the live streaming of the first live stream (the streamer and/or his or her reaction on the second live stream) and the live streaming of the second live stream (viewer recommended content and/or streamer's AI recommended content), viewers may click on a link on the second live stream to play the recommended content directly (instead of watching it through the live streaming), take actions to give out "likes" to the recommended content so that the "likes" (representing a degree of popularity) may be accumulated for the recommended content, etc.

FIG. 7 is a schematic structural diagram of an example computer system 700 applicable to implementing an electronic device (for example, the server or one of the terminal devices shown in FIG. 1), arranged in accordance with at least some embodiments described herein. It is to be understood that the computer system shown in FIG. 7 is provided for illustration only instead of limiting the functions and applications of the embodiments described herein.

As depicted, the computer system 700 may include a central processing unit (CPU) 705. The CPU 705 may perform various operations and processing based on programs stored in a read-only memory (ROM) 710 or programs loaded from a storage device 740 to a random-access memory (RAM) 715. The RAM 714 may also store various data and programs required for operations of the system 700. The CPU 705, the ROM 710, and the RAM 720 may be connected to each other via a bus 720. An input/output (I/O) interface 725 may also be connected to the bus 720.

The components connected to the I/O interface 725 may further include an input device 730 including a keyboard, a mouse, a digital pen, a drawing pad, or the like; an output device 735 including a display such as a liquid crystal display (LCD), a speaker, or the like; a storage device 740 including a hard disk or the like; and a communication device 745 including a network interface card such as a LAN card, a modem, or the like. The communication device 745 may perform communication processing via a network such as the Internet, a WAN, a LAN, a LIN, a cloud, etc. In an embodiment, a driver 750 may also be connected to the I/O interface 725. A removable medium 755 such as a magnetic disk, an optical disk, a magneto-optical disk, a semiconductor memory, or the like may be mounted on the driver 750 as desired, such that a computer program read from the removable medium 755 may be installed in the storage device 740.

It is to be understood that the processes described with reference to the flowcharts of FIGS. 2-4 and/or GUIs of FIGS. 5 and 6 may be implemented as computer software programs. The computer program product may include a computer program stored in a computer readable non-volatile medium. The computer program includes program codes for performing the method shown in the flowcharts and/or GUIs. In this embodiment, the computer program may be downloaded and installed from the network via the communication device 745, and/or may be installed from the removable medium 755. The computer program, when being executed by the central processing unit (CPU) 705, can implement the above functions specified in the method in the embodiments disclosed herein.

Embodiments disclosed herein may enable viewers to send contents (e.g., videos, etc.) to another's (e.g., the streamer, etc.) augmented AI recommended content list or page. Embodiments disclosed herein may help to integrate segmentation algorithms with live streaming (or live feed), integrate the AI recommended content list or page with live streaming, generate new user interface logic, increase live stream retention rate, enable microtransactions (e.g., the purchasing of in-app currency which can be exchanged for in-app goods and/or services) for sending contents for the streamer to react to, integrate community into the live streaming feature, enable pipeline for sending contents to the streamer for reaction, apply effects to live contents, and/or increase engagement of viewers of livestreams.

Embodiments disclosed herein may also help to increase engagement and sense of community, provide a new form of revenue stream for monetization for streamers, and/or provide a new way to for the viewer to gain followers. Embodiments disclosed herein may further help to take safety into account. In an example embodiment, the streamer may determine whether the viewer recommended content videos need to be approved before showing on a live streaming, or disable the live reaction feature entirely. In an example embodiment, the option "do not allow requests from particular viewer(s)" may be implemented or configured at the streamer side. In an example embodiment, the streamer may assign stream moderator(s) to review the viewer recommended content to streamline the process for the streamer to react to viewer recommended content and to maximize profits.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects 1-15, 16-19, and 20-26 can be combined with each other.

Aspect 1. A method for live streaming content from a content request, the method comprising: live streaming a first content from a first user side; activating a live reaction at the first user side; providing the content request at a second user side when the live reaction is activated; determining a second content, sending the content request indicating the second content, and receiving a confirmation at the second user side indicating the content request being sent; receiving, at the first user side, the content request sent from the second user side; approving the content request at the first user side; and after the content request is approved, live streaming, from the first user side, the second content corresponding to the content request.

Aspect 2. The method of aspect 1, further comprising: deactivating the live reaction at the first user side after the live reaction is activated.

Aspect 3. The method of aspect 1 or aspect 2, further comprising: rejecting the content request at the first user side when a condition is not satisfied.

Aspect 4. The method of any one of aspects 1-3, further comprising: after the content request is approved, receiving, at the first user side, the second content for live streaming.

Aspect 5. The method of any one of aspects 1-4, further comprising: reacting, at the first user side, to the second content during the live streaming of the second content.

Aspect 6. The method of aspect 5, further comprising: switching, at the first user side, between reaction layout types for live streaming the second content, wherein the reaction layout types include a side by side layout, a top and bottom layout, a picture in picture layout, and a segmentation layout.

Aspect 7. The method of any one of aspects 1-6, wherein live streaming of the first content is a live streaming of a first user.

Aspect 8. The method of any one of aspects 1-7, wherein the second content is a video determined by a second user.

Aspect 9. The method of any one of aspects 1-8, wherein activating the live reaction includes setting a price to an amount at the first user side for accepting the content request.

Aspect 10. The method of aspect 9, wherein the price ranges from free to a first amount in a currency type.

Aspect 11. The method of aspect 9, further comprising: distributing the amount from the second user side to the first user side after the content request is approved.

Aspect 12. The method of any one of aspects 1-11, further comprising: pipelining contents from multiple content requests; and sorting the contents by time, price, or recommendation.

Aspect 13. The method of any one of aspects 1-12, further comprising: recording the live streaming of the first content and the live streaming of the second content as a new content.

Aspect 14. The method of any one of aspects 1-13, further comprising: enabling a link to the second content during the live streaming of the second content.

Aspect 15. The method of any one of aspects 1-14, further comprising: accumulating a number of actions on the second content during the live streaming of the second content.

Aspect 16. A method for live streaming content from a content request, the method comprising: live streaming a first content from a first user side; activating a live reaction at the first user side; receiving, at the first user side, the content request sent from a second user side; approving the content request at the first user side; and after the content request is approved, live streaming, from the first user side, a second content corresponding to the content request.

Aspect 17. The method of aspect 16, further comprising: reacting, at the first user side, to the second content during the live streaming of the second content.

Aspect 18. The method of aspect 17, further comprising: switching, at the first user side, between reaction layout types for live streaming the second content, wherein the reaction layout types include a side by side layout, a top and bottom layout, a picture in picture layout, and a segmentation layout.

Aspect 19. The method of any one of aspects 16-18, further comprising: pipelining contents from multiple content requests; and sorting the contents by time, price, or recommendation.

Aspect 20. A method for live streaming content from a content request, the method comprising: receiving, at a second user side, live streaming of a first content from a first user side; providing the content request at the second user side when a live reaction is activated; determining a second content, sending the content request indicating the second content, and receiving a confirmation at the second user side indicating the content request being sent; and receiving, at the second user side, live streaming of the second content corresponding to the content request after the content request is approved.

Aspect 21. The method of aspect 20, wherein providing the content request includes providing a comment with the second content.

Aspect 22. The method of aspect 20 or aspect 21, wherein providing the content request includes determining a price for the content request, wherein determining the price for the content request includes setting the price to a minimum price or setting the price to a bidding price.

Aspect 23. The method of aspect 22, further comprising: distributing an amount of the price from the second user side to the first user side when the content request is approved.

Aspect 24. The method of any one of aspects 20-23, further comprising: recording the live streaming of the first content and the live streaming of the second content as a new content.

Aspect 25. The method of any one of aspects 20-24, further comprising: enabling a link to the second content during the live streaming of the second content.

Aspect 26. The method of any one of aspects 20-25, further comprising: accumulating a number of actions on the second content during the live streaming of the second content.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

The invention claimed is:

1. A method for streaming content, the method comprising:
   activating a live react feature at a user device of a first user;
   receiving, at the user device of the first user, a content request sent from a user device of a second user, the content request being sent by the second user via an interface of a streaming application, wherein the content request indicates content selected by the second user; and
   streaming, from the user device of the first user to the user device of the second user, a video corresponding to the content request; and
   during the streaming, providing an instant messaging communication for interaction between the first user and the second user.

2. The method of claim 1, wherein the content request is sent in response to the second user clicking on an icon in the interface of the streaming application.

3. The method of claim 1, wherein the instant messaging communications include texts, emoticons, gifts, and/or likes.

4. The method of claim 1, further comprising: providing comments on the video.

5. The method of claim 1, further comprising: receiving, at the user device of the first user, a reaction to the video during the streaming of the video.

6. The method of claim 5, further comprising:

switching, at the user device of the first user, between reaction layout types for streaming the content, wherein the reaction layout types include a side by side layout, a top and bottom layout, a picture in picture layout, and a segmentation layout.

7. The method of claim 6, wherein the video is one of a plurality of videos and the content request is one of a plurality of content requests, and the plurality of videos are arranged in a pipeline for display in the interface.

8. The method of claim 7, the method further comprising:

sorting the videos in the pipeline by time, value, or recommendation.

9. The method of claim 1, wherein the streaming is live streaming of the video.

10. A method for streaming content, the method comprising:

streaming content to a plurality of terminal devices from a streaming content platform;

activating a live react feature during the streaming to enable users of the plurality of terminal devices to send content requests indicating content selected by a respective user; and during the streaming, providing an asynchronous instant messaging communication for interaction between a first user and a second user.

11. The method of claim 10, wherein the streaming content is displayed in an interface of a streaming application on each of the plurality of terminal devices.

12. The method of claim 11, wherein the streaming of the content is live streaming from the first user to the second user via respective streaming applications of each of the first user and second user executed on respective terminal devices.

13. The method of claim 12, wherein the streaming is in response to a content request sent from the second user to the first user.

14. The method of claim 13, wherein the content request is sent in response to the second user clicking on an icon in the interface of the streaming application of the second user.

15. The method of claim 10, wherein the asynchronous instant messaging communication includes texts, emoticons, gifts, and/or or likes.

16. The method of claim 10, further comprising:

providing comments on the streaming content.

17. The method of claim 10, further comprising:

receiving, at the first user side, a reaction to the streaming content during the streaming.

18. The method of claim 10, wherein the streaming content is a video.

19. The method of claim 18, wherein the video is one of a plurality of videos, and the plurality of videos are arranged in a pipeline for display.

20. A method for streaming video, the method comprising:

streaming a video to a plurality of terminal devices from a video platform;

activating a live react feature during the streaming to enable users of the plurality of terminal devices to send content requests indicating content selected by a respective user; and during the streaming, providing an instant messaging communication for interaction between a first user and a second user, wherein:

the streaming of the video is streaming from the first user to the second user via respective streaming applications, and the instant messaging communication includes one or more of texts, emoticons, gifts, or likes.

* * * * *